(12) United States Patent
Gonzalez et al.

(10) Patent No.: US 6,446,767 B1
(45) Date of Patent: *Sep. 10, 2002

(54) CALIPER PISTONS WITH IMPROVED HEAT ISOLATION

(76) Inventors: Angelo Gonzalez, 2024- 45 St. N., St Petersburg, FL (US) 33713; Robin Wilkie, 5245 58th Ave. N., St. Petersburg, FL (US) 33709

( * ) Notice: Subject to any disclaimer, the term of this patent is extended or adjusted under 35 U.S.C. 154(b) by 0 days.

This patent is subject to a terminal disclaimer.

(21) Appl. No.: 09/941,336

(22) Filed: Aug. 29, 2001

Related U.S. Application Data

(63) Continuation-in-part of application No. 09/465,034, filed on Dec. 16, 1999, now Pat. No. 6,311,806.

(51) Int. Cl.$^7$ ................................................ F16D 55/02
(52) U.S. Cl. ...................................... 188/71.6; 188/72.4
(58) Field of Search ............................. 188/71.6, 71.3, 188/73.38, 72.5, 72.4

(56) References Cited

U.S. PATENT DOCUMENTS

| | | | | |
|---|---|---|---|---|
| 4,496,033 A | * | 1/1985 | Hall et al. ................. | 188/347 |
| 4,867,280 A | * | 9/1989 | Von Gruenberg et al. . | 188/72.4 |
| 4,955,353 A | * | 9/1990 | Amataka et al. ............. | 123/668 |
| 5,236,787 A | * | 8/1993 | Grassi ......................... | 428/558 |
| 5,515,948 A | * | 5/1996 | Gilliland .................... | 188/72.5 |
| 5,538,105 A | * | 7/1996 | Rike ........................ | 188/73.32 |
| 5,560,457 A | * | 10/1996 | Rike .......................... | 188/352 |
| 5,826,686 A | * | 10/1998 | Rike .......................... | 188/73.1 |
| 5,879,816 A | * | 3/1999 | Mori et al. .................. | 428/621 |
| 6,082,509 A | * | 7/2000 | Buckley ..................... | 188/359 |
| 6,311,806 B1 | * | 11/2001 | Gonzalez et al. .......... | 188/71.6 |

* cited by examiner

*Primary Examiner*—Jack Lavinder
*Assistant Examiner*—Devon Kramer

(57) ABSTRACT

A piston structure for use in a brake caliper has a cylindrical base portion having an annular receiving recess and a base mounted spring received therein. A cylindrical brake pad engaging portion has an annular recess formed within its length. A recess is formed within the length of the base portion with an elastomeric o-ring positioned within the recess. A thin layer of metallic material is integrally formed with the remainder of the piston. The thin layer of metallic material is adapted to engage the surface of an adjacent brake pad.

4 Claims, 6 Drawing Sheets

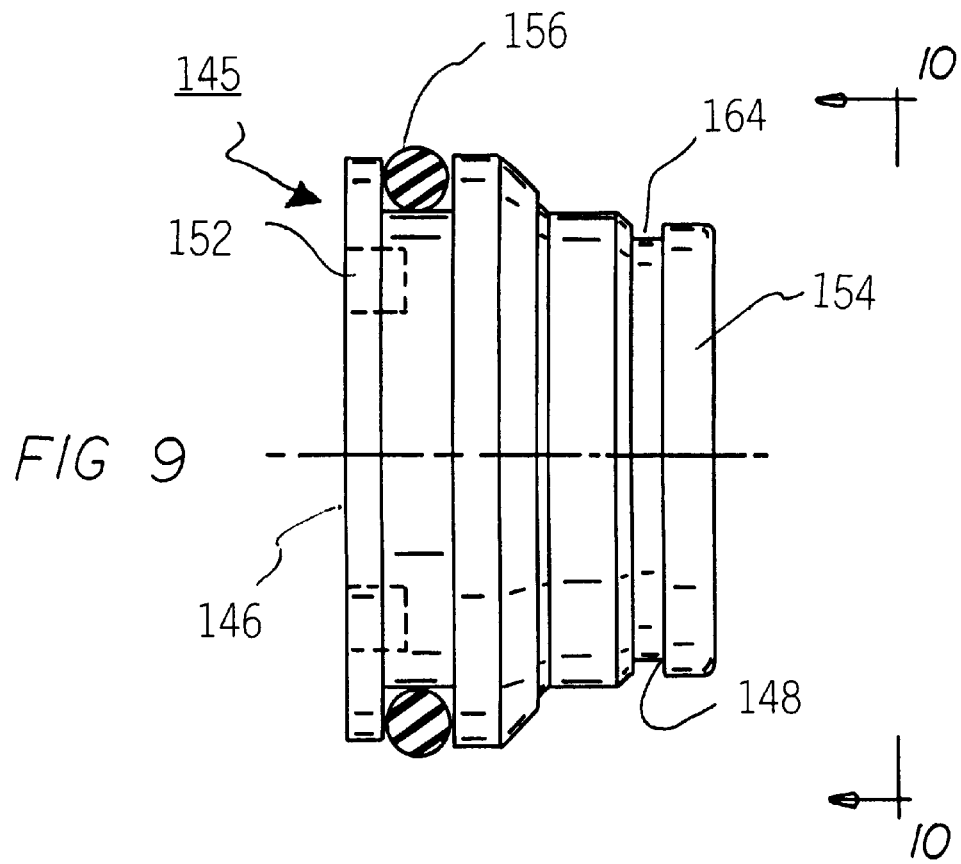
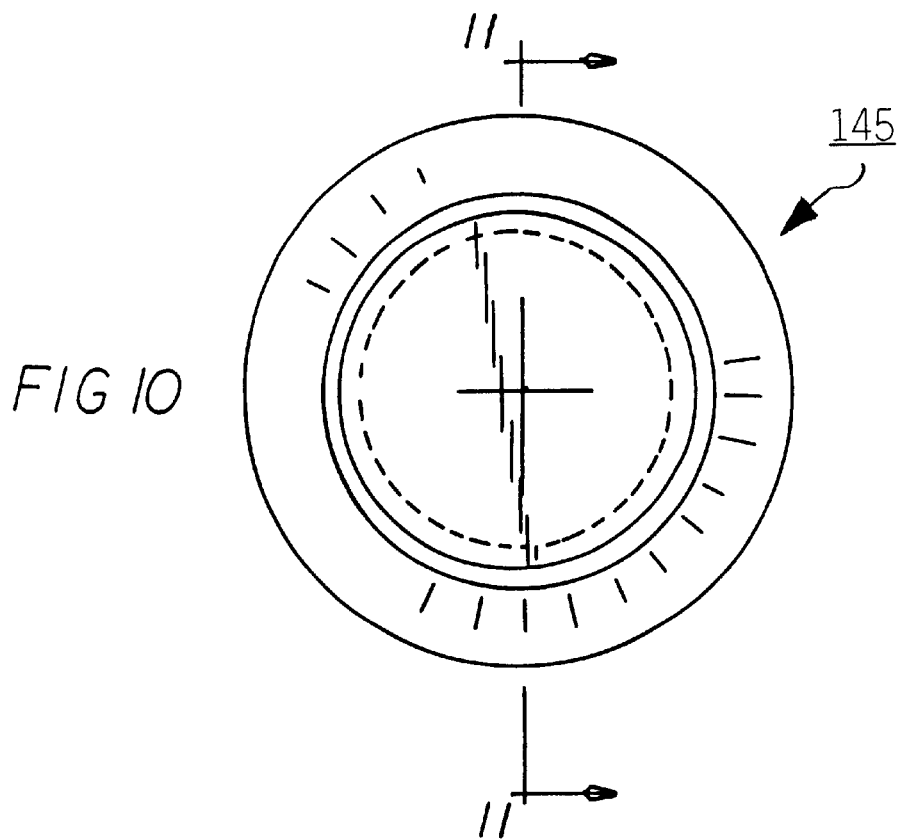

CALIPER PISTONS WITH IMPROVED HEAT ISOLATION

RELATED APPLICATION

This application is a continuation-in-art of co-pending application Ser. No. 09/465,034 filed Dec. 16, 1999 now U.S. Pat. No. 6,311,806.

BACKGROUND OF THE INVENTION

1. Field of the Invention

The present invention relates to a caliper piston construction and more particularly to a piston construction which allows for increased heat isolation.

2. Description of Related Art

Many vehicles today simultaneously employ two types of braking systems: disc and drum. It is widely accepted, however, that disc brakes provide the majority of the stopping power. Thus, conventional braking systems can be improved by converting existing drum brakes to disc. Disc brakes can be further improved by switching to calipers which employ multiple pistons.

An example of a disc brake employing multiple pistons is U.S. Pat. No. 5,284,227 to Pelfrey. Furthermore, U.S. Pat. No. 4,505,363 to Herbulot et al. discloses a twin-disc brake system employing multiple pistons. Lastly, U.S. Pat. No. 4,064,974 to Filderman discloses an actuator mounting system for a multiple piston system.

While each of these braking systems achieves its own particular objective, none of them provides a construction with improved heat isolating characteristics. Furthermore, none of the above referenced systems limits the amount of air which escapes into the brake fluid lines.

Therefore, it can be appreciated that there exists a continuing need for a new and improved brake system which can be used for heat isolation and air intake reduction. In this regard, the present invention substantially fulfills this need.

BRIEF SUMMARY OF THE INVENTION

The general purpose of the present invention is to provide an improved piston construction for use within a brake caliper.

To attain this, the present invention essentially comprises an improved disc braking system of the type employing two mating housings. Each housing has a pair of cylindrical piston receiving recesses. Each of the piston receiving recesses is adapted to support a base mounted spring. A brake fluid inlet passage and an upstanding seal are formed adjacent an opened end of the piston recess. The brake system is further adapted to support a slidably positioned brake pad formed adjacent the opened ends of the piston recesses. An improved piston structure is provided. The piston structure is fabricated of a metallic material. Next provided as part of the piston structure is a cylindrical base portion formed from a major diameter. The base portion has an annular spring receiving recess formed therein with a base mounted coil spring received within the annular recess. A cylindrical recess formed within the length of the base portion is provided. An elastomeric o-ring is provided. The o-ring is positioned within the recess and has an outer surface adapted to form a fluid-tight seal with a cylindrical piston recess of the brake system. Next provided is a cylindrical brake pad engaging portion formed from a minor diameter. A thin layer of metallic material is integrally formed in the remainder of the piston and is adapted to engage the surface of an adjacent brake pad. A cylindrical recess is formed within the length of the engaging portion and is adapted to receive a peripheral edge of the upstanding seal of the braking system. Lastly, a threaded aperture extends through the thin layer of metallic material and into the adjacent portion of the piston. In this manner, the thin layer of metallic material may be removed and replaced by a heat isolating material and retained by a bolt.

It is therefore an object of the present invention to provide an improved piston construction for use within a brake caliper.

It is another object of the present invention to provide a piston construction which efficiently isolates the heat generated during braking operations.

It is a further object of the present invention to provide an improved piston construction which limits the amount of air which escapes into the brake lines.

An even further object of the present invention is to provide a brake system which reduces maintenance needs.

Even still another object of the present invention is to provide a piston construction which is light weight and easy to manufacture.

Lastly, it is an object of the present invention to provide an improved piston structure for use in a brake caliper having a cylindrical base portion having an annular receiving recess and a base mounted spring received therein. A cylindrical brake pad engaging portion has an annular recess formed within its length. A recess is formed within the length of the base portion with an elastomeric o-ring positioned within the recess. A thin layer of metallic material is integrally formed with the remainder of the piston. The thin layer of metallic material is adapted to engage the surface of an adjacent brake pad.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 9 is an elevational view similar to FIG. 3 but illustrating an alternate embodiment of the invention.

FIG. 10 is a plan view of the alternate embodiment of FIG. 9.

The same reference numerals refer to the same parts throughout the various Figures.

DETAILED DESCRIPTION OF THE INVENTION

The present invention relates to a piston construction for use in a caliper type braking system. The piston construction employs an insulator removably secured at its outer end. This construction promotes increased heat isolation during braking operations. The piston of the present invention also employs an o-ring which is secured within a cylindrical recess. This o-ring ensures a fluid tight seal between the piston and the piston housing. Through the use of the o-ring, air is prevented from entering the brake lines. The various features of the present invention will be described more fully hereinafter.

Figure 1:
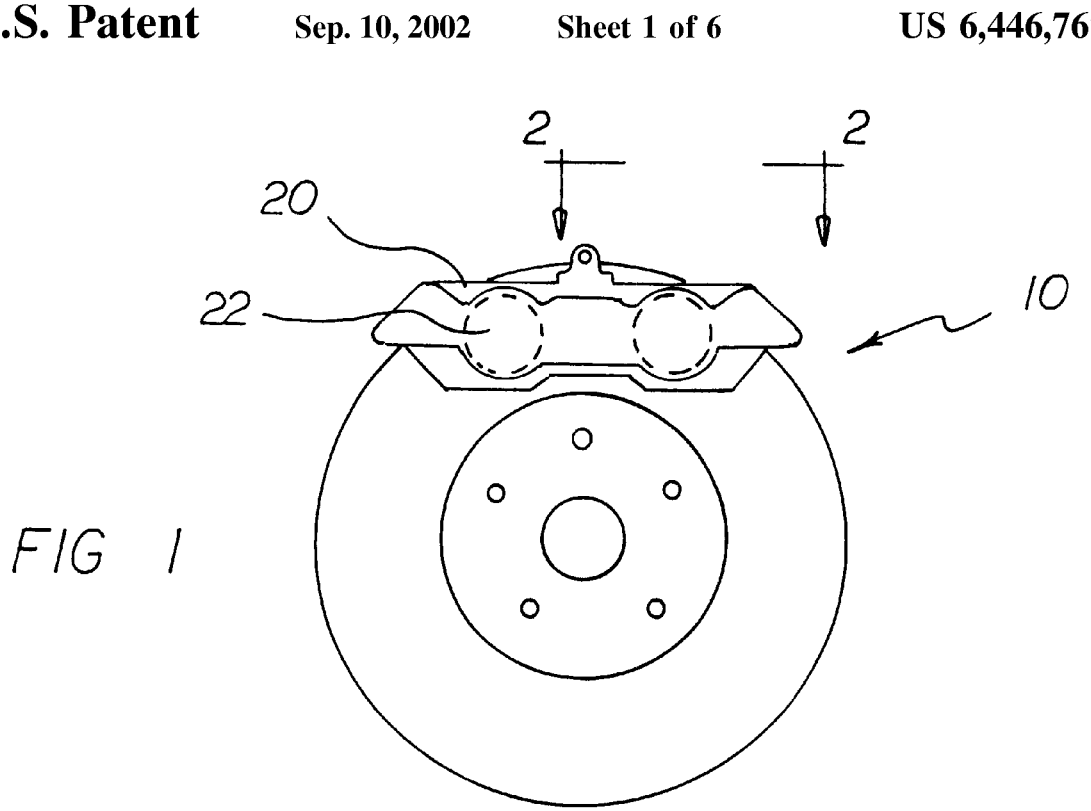
FIG. 1 is a side elevational view of a caliper brake system.

FIG. 1 illustrates a disk braking system 10. The system 10 employs a disc 18 to which a caliper 20 is affixed. As is conventional in the braking art, the caliper 20 houses a series of pistons 22. In the embodiment disclosed, the caliper 20 houses four independently operable pistons 22. Each piston 22 reciprocates in response to changes in brake fluid pressure. When a piston 22 is extended it comes into contact with a brake pad or friction lining 24. The friction lining 24, in turn, comes into contact with the disc 18 thereby inhibiting its rotation. Conversely, a decrease in brake pressure results in the pistons 22 being returned to a steady state orientation. This, in turn, permits free rotation of the disc 18.

Figure 2:
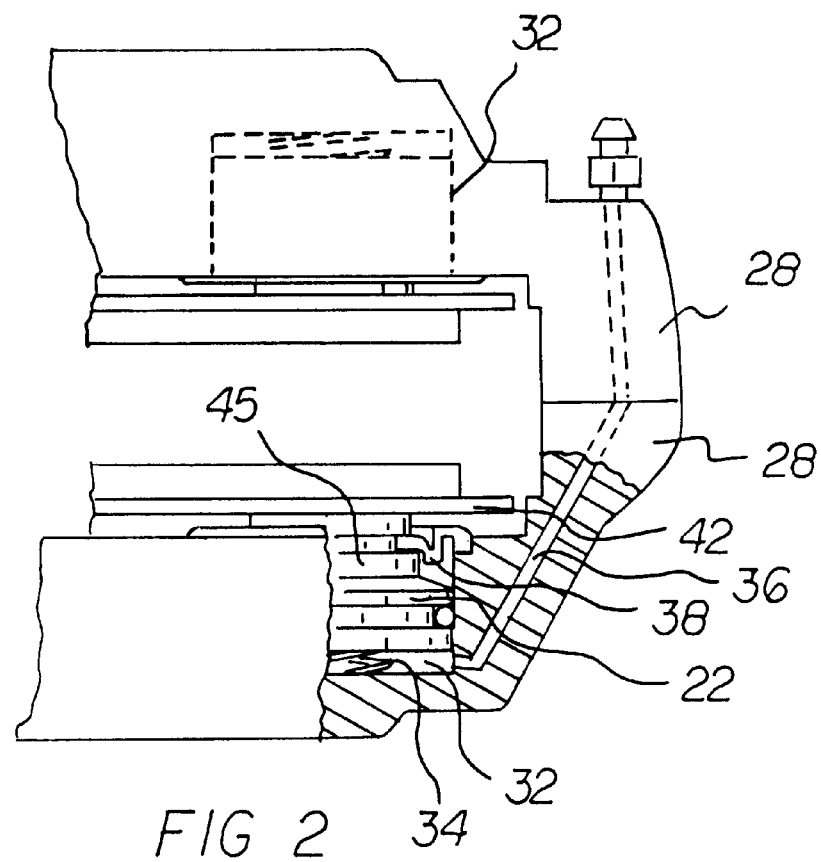
FIG. 2 is a sectional view of an individual caliper.
Figure 3:
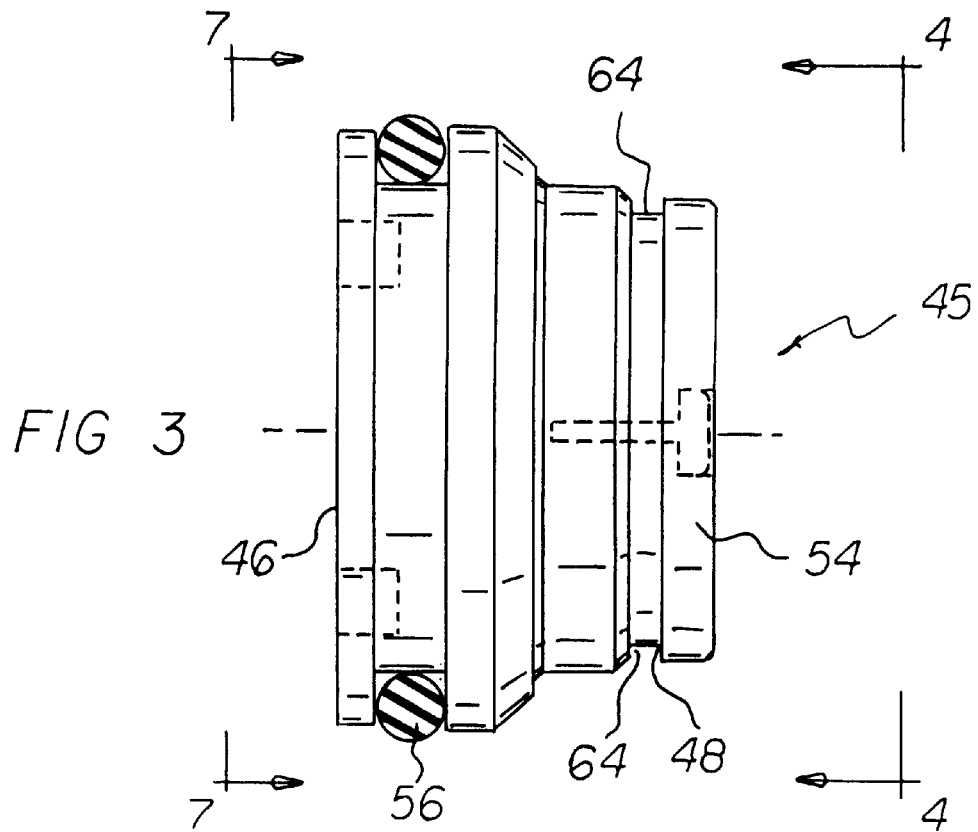
FIG. 3 is an elevational view of a piston constructed in accordance with the present invention.
Figure 4:
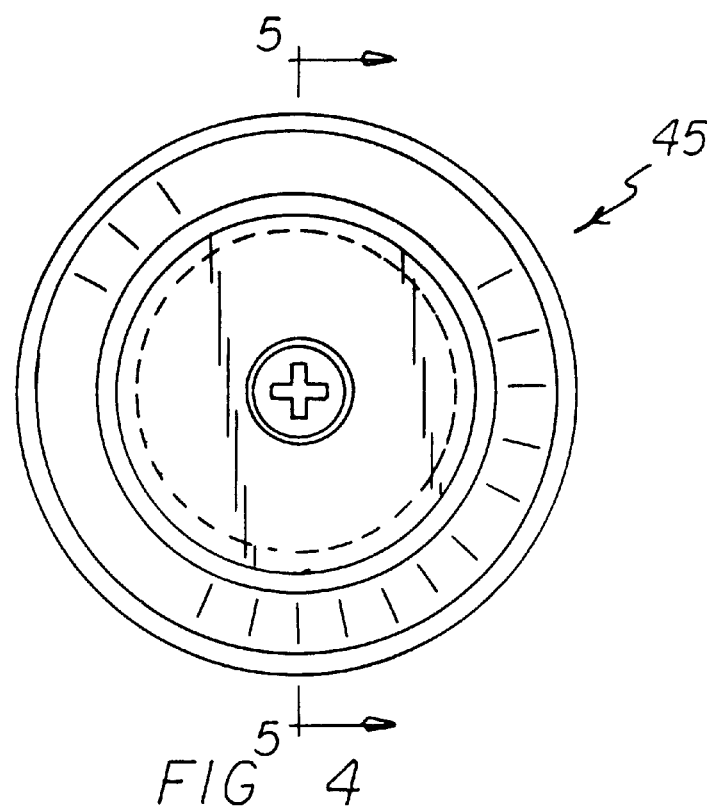
FIG. 4 is a plan view of the piston taken along line 4—4 of FIG. 3.

With continuing reference to FIGS. 1 and 2, it can be seen that the caliper 20 is actually comprised of two mating housings 28. Each of these housings 28 contain a pair of cylindrical piston receiving recesses 32. The piston recess 32 are most clearly seen with reference to FIG. 2. Each recesses 32 is defined by a base mounted spring 34 and a brake fluid inlet passage 36. Furthermore, an upstanding seal 38 is formed adjacent an opened end 42 of the piston recess 32. The area around the piston 22 bounded by the base and seal forms a brake fluid chamber. FIG. 2 also illustrates the fiction linings 24 which are slidably positioned adjacent the opened end 42 of the piston housings 32.

Figure 5:
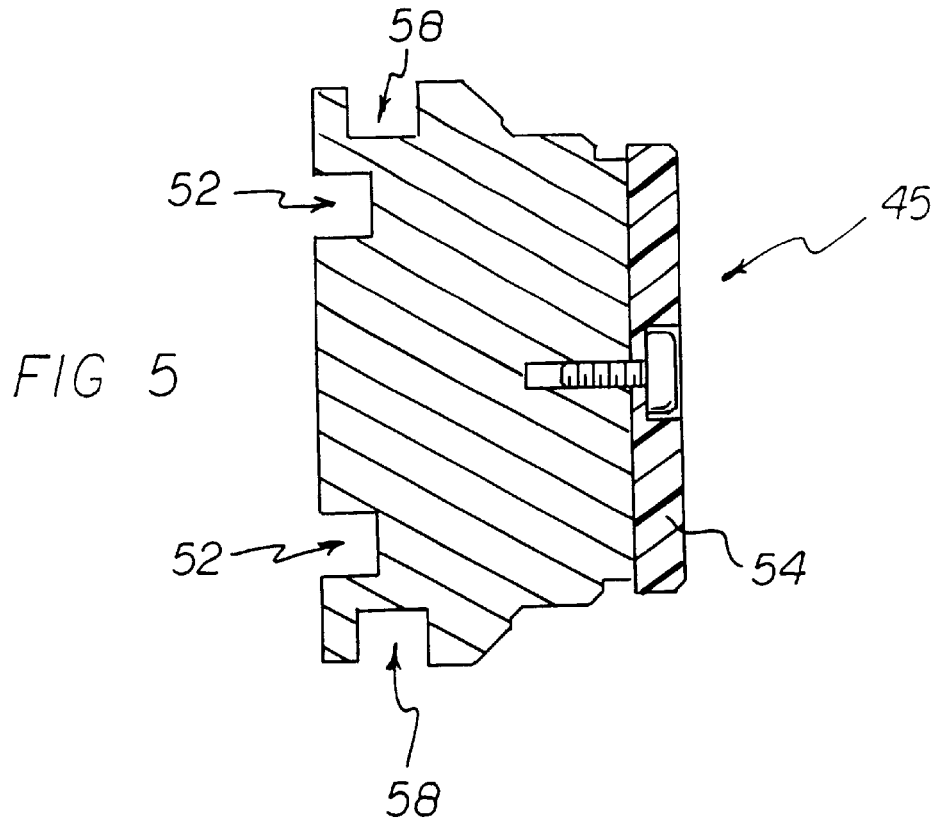
FIG. 5 is a sectional view taken along line 5—5 of FIG. 4.

The present invention resides within the construction of the pistons 22 utilized within the caliper 20. More specifically, FIGS. 3–8 are detailed views of the pistons 45 of the present invention. The piston 45 of the present invention is defined by both a base portion 46 and an engaging portion 48. The base portion 46 is preferably cylindrical in shape and of a diameter greater than the diameter of the engaging portion 48. The entire piston 45 is preferably constructed from an anodized aluminum. FIG. 5 illustrates the circular spring receiving recess 52 formed within the end of the base portion 46. Such recess 52 is for use in receiving the spring 34 mounted within the base of the caliper housing 28. The spring 34 functions in ensuring the proper piston orientation within the housing 32 during steady state conditions.

Additional advantages are realized through the use of improved sealing. Namely, the piston of the present invention 45 includes a sealing o-ring 56. Such o-ring 56 is seated within a cylindrical recess 64 formed within the length of the base portion 46. It has been determined that a recess 64 of a uniform rectangular cross-section produces advantageous results. The o-ring 56 is preferably elastomeric and has an outer surface that is adapted to form a fluid tight seal with the surrounding cylindrical caliper recess 32. The o-ring 56 structure is an improvement over the prior cup-type seals employed by the prior art. Specifically, the o-ring construction 56 has a circular cross section which helps limit the volume of air which can access the brake fluid chamber. This, in turn, reduces the amount of air that can make its way into the brake lines. Thus, the amount of air which needs to be "bled" is reduced. Thus, the o-ring 56 structure employed by the pistons 45 of the present invention obviates periodic bleeding.

The brake pad engaging portion 48 is formed opposite the base portion 46. In the preferred embodiment, the engaging portion 48 is cylindrical and formed of a lesser, or minor, diameter. The engaging portion 48 includes a cylindrical recess 64 formed within its length. This recess 64 is adapted to receive a peripheral edge of the upstanding seal 38 of the braking system 10. Thus, the joining of the recess 64 and seal forms 38 the forward extent of the brake fluid chamber.

Figure 6:
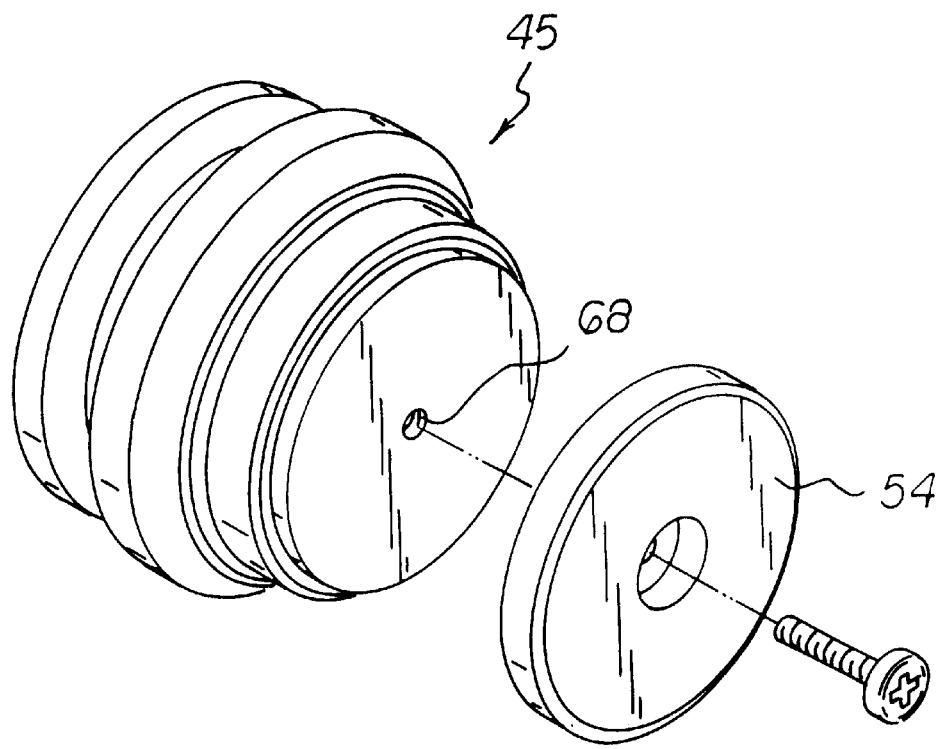
FIG. 6 is a perspective exploded view of the piston and isolating material of the present invention.
Figure 7:
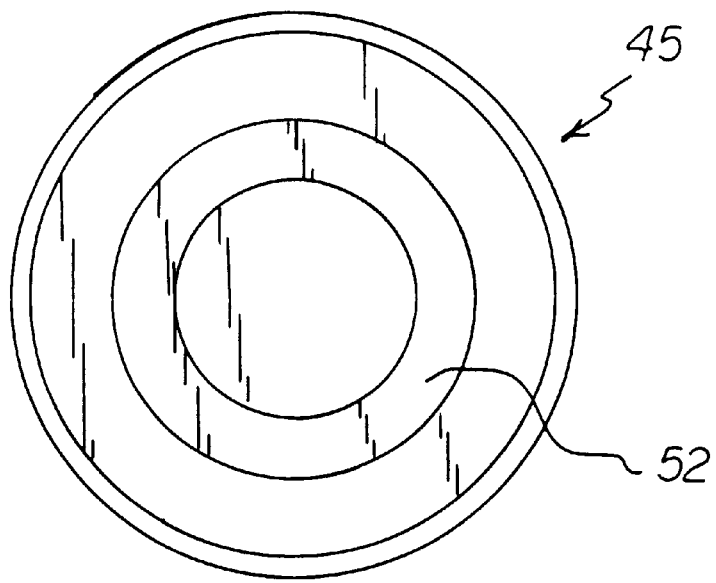
FIG. 7 is a plan view taken along line 7—7 of FIG. 3.
Figure 8:
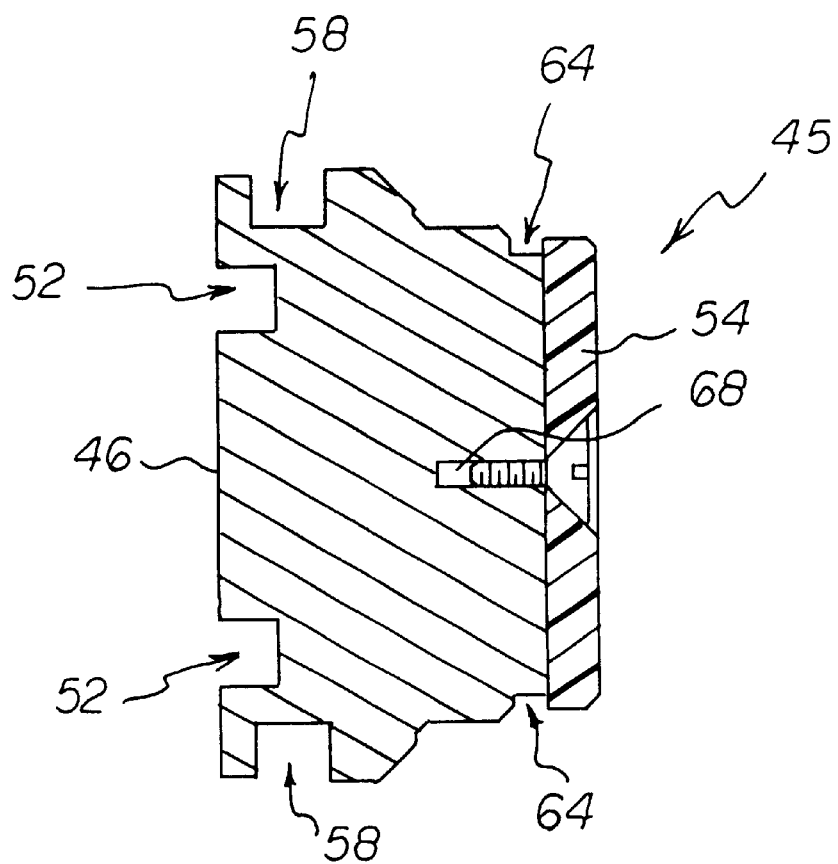
FIG. 8 is a sectional view of FIG. 7.
Figure 11:
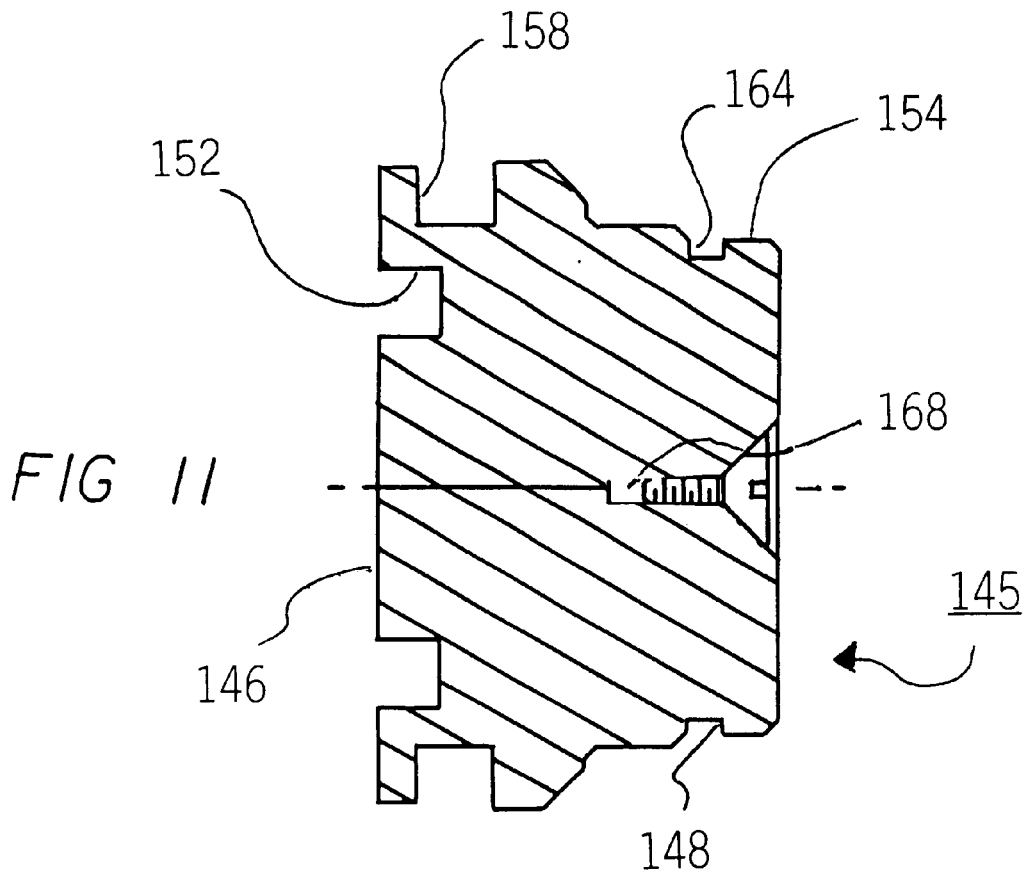
FIG. 11 is a cross sectional view taken along line 11—11 of FIG. 10.
Figure 12:
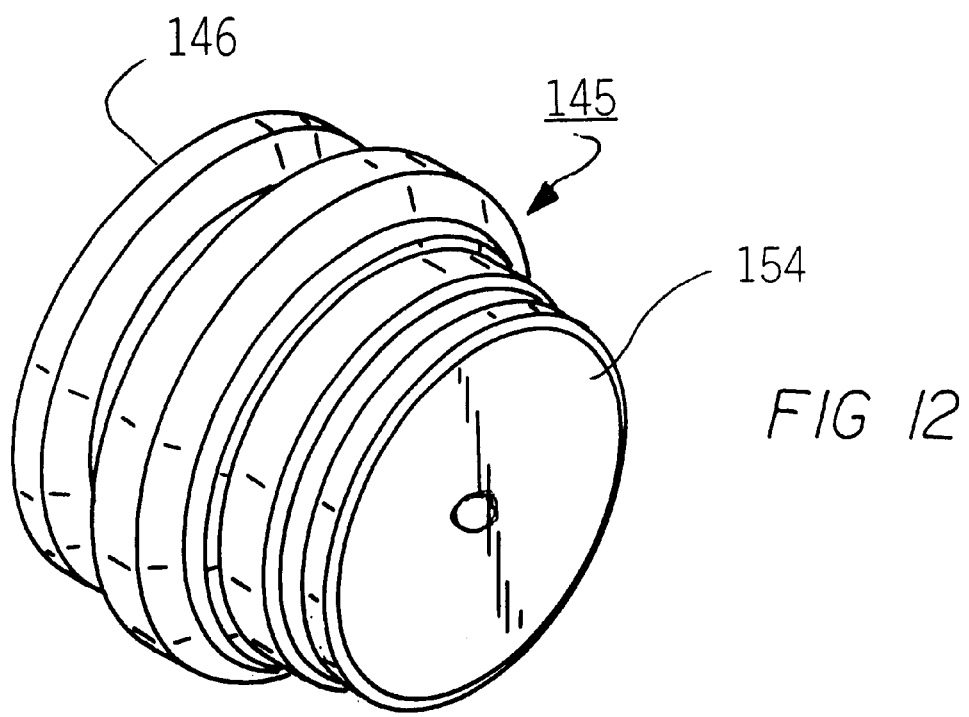
FIG. 12 is a perspective view of the embodiment of FIGS. 9–11.

A thin layer of heat isolating material 54 is adapted to be removably secured to the outer face of the engaging portion 48. In this regard, an axial aperture 68 is formed into the outer face for removably accepting a threaded fastener 78. The layer of heat isolating material 54 also includes either a cylindrical aperture (note FIG. 5) or a frustro conical aperture (note FIG. 8) for use in counter sinking the fastener 78. As a result, when secured, the fastener head does not protrude beyond the surface of the isolating material 54. FIG. 6 is an exploded view showing the manner in which the isolating material is secured to the outer face of the engaging portion 48. As is evident, the heat isolating material 54 engages the brake pad. Thus, heat generated during braking operations is isolated by the isolating material. In the preferred embodiment, the isolating material 54 is formed from a thermoset plastic laminate. The insulator isolates the heat form the rotor from traveling through the piston and the fluid.

An alternate embodiment of the invention is shown in FIGS. 9–12. Such alternate embodiment is a disc braking system and the improved piston employed therein. More specifically, the improved disc braking system 110 is of the type employing two mating housings. Each housing has a pair of cylindrical piston receiving recesses. Each of the piston receiving recesses is adapted to support a base mounted spring. A brake fluid inlet passage and an upstanding seal are formed adjacent an opened end of the piston recess. The brake system is further adapted to support a slidably positioned brake pad formed adjacent the opened ends of the piston recesses. An improved piston structure is provided. The piston structure is fabricated of a metallic material.

Next provided as part of the piston structure is a cylindrical base portion 146 formed from a major diameter. The base portion has an annular spring receiving recess 152 formed therein with a base mounted coil spring received within the annular recess.

A cylindrical recess 158 formed within the length of the base portion is provided. An elastomeric o-ring 156 is provided. The o-ring is positioned within the recess and has an outer surface adapted to form a fluid-tight seal with a cylindrical piston recess of the brake system.

Next provided is a cylindrical brake pad engaging portion 148 formed from a minor diameter.

A thin layer 154 of metallic material is integrally formed in the remainder of the piston and is adapted to engage the surface of an adjacent brake pad.

A cylindrical recess 164 is formed within the length of the engaging portion and is adapted to receive a peripheral edge of the upstanding seal 38 of the braking system.

Lastly, a threaded aperture 168 extends through the thin layer of metallic material and into the adjacent portion of the piston. In this manner, the thin layer of metallic material may be removed and replaced by a heat isolating material and retained by a bolt.

This detailed description has been provided only for illustrative purposes. It is recognized that other embodiments may be articulated without departing from the objects and scope of the present invention. Any such modifications and variations are meant to be within the scope of the invention as contained within the following claims.

What is claimed as being new and desired to be protected by LETTERS PATENT of the United States is as follows:

1. An improved disc braking system of the type employing two mating housings, with each housing having a pair of cylindrical piston receiving recesses, and wherein each of the piston receiving recesses is adapted to support a base mounted spring, a brake fluid inlet passage and an upstanding seal formed adjacent an opened end of the piston recess, the brake system further adapted to support a slidably positioned brake pad formed adjacent the opened ends of the piston recesses, an improved piston structure fabricated of a metallic material comprising:

a cylindrical base portion formed from a major diameter, the base portion having an annular spring receiving recess formed therein with a base mounted coil spring received within the annular recess;

a cylindrical recess formed within the length of the base portion, an elastomeric o-ring positioned within the recess and having an outer surface adapted to form a fluid tight seal with a cylindrical piston recess of the brake system;

a cylindrical brake pad engaging portion formed from a minor diameter;

a thin layer of metallic material integrally formed in the remainder of the piston adapted to engage the surface of an adjacent brake pad;

a cylindrical recess formed within the length of the engaging portion and adapted to receive a peripheral edge of the upstanding seal of the braking system; and a threaded aperture extending through the thin layer of metallic material and into the adjacent portion of the piston whereby the thin layer of metallic material may be removed and replaced by a heat isolating material and retained by a bolt.

2. An improved piston structure for use in a brake caliper comprising:

a cylindrical metallic base portion having an annular receiving recess and a base mounted spring received therein;

a cylindrical brake pad engaging portion having an annular recess formed within its length;

a recess formed within the length of the base portion with an elastomeric o-ring positioned within the recess; and a layer of metallic material the same as the cylindrical metallic base portion integrally formed with the remainder of the piston, the layer of metallic material adapted to engage the surface of an adjacent brake pad.

3. The piston structure as described in claim 2 and further including a threaded aperture extending through the layer of metallic material and into the adjacent portion of the piston whereby the layer of metallic material may be removed and replaced by a heat isolating material and retained by a bolt;

a recess formed within the length of the base portion; and an elastomeric o-ring positioned within the recess.

4. An improved disc braking system of the type employing two mating housing, with each housing having a pair of cylindrical piston receiving recesses, and wherein each of the piston receiving recesses is adapted to support a base mounted spring, a brake fluid inlet passage and an upstanding seal formed adjacent an opened end of the piston recess, the brake system further adapted to support a slidably positioned brake pad formed adjacent the opened ends of the piston recesses, an improved piston structure fabricated of a one piece metallic material comprising:

a cylindrical base portion formed from a major diameter, the base portion having an annular spring receiving recess formed therein with a base mounted coil spring received within the annular recess;

a cylindrical recess formed within the length of the base portion, an elastomeric o-ring positioned within the recess and having an outer surface adapted to form a fluid tight seal with a cylindrical piston recess of the brake system;

a cylindrical brake pad engaging portion formed from a minor diameter, the base portion also including a circular pressure applying surface with a minor diameter and fabricated of metallic material machined and formed from the remainder of the piston and adapted to engage the surface of an adjacent brake pad.

* * * * *